United States Patent [19]

Lippiatt

[11] Patent Number: 5,318,421
[45] Date of Patent: Jun. 7, 1994

[54] APPARATUS FOR PRODUCING A DEFORMED PIPE

[75] Inventor: Raymond Lippiatt, Ringwood, England

[73] Assignee: Subterra Limited, Dorset, England

[21] Appl. No.: 882,152

[22] Filed: May 13, 1992

[30] Foreign Application Priority Data

May 17, 1991 [GB] United Kingdom ............... 9110703
Feb. 26, 1992 [GB] United Kingdom ............... 9204051

[51] Int. Cl.$^5$ ............................................. B29C 53/08
[52] U.S. Cl. .................................. 425/363; 264/280; 425/371; 425/392
[58] Field of Search ................... 72/176; 264/280; 425/363, 371, 384, 392

[56] References Cited

U.S. PATENT DOCUMENTS

| | | | |
|---|---|---|---|
| 3,256,783 | 6/1966 | Richter | 425/392 |
| 3,781,155 | 12/1973 | Wiltshire | 425/392 |
| 4,028,037 | 6/1977 | Dawson | 425/392 |
| 4,863,365 | 9/1989 | Ledoux et al. | 425/343 |
| 4,985,196 | 1/1991 | LeDoux et al. | 264/516 |
| 4,986,951 | 1/1991 | Ledoux et al. | 264/516 |
| 4,998,871 | 3/1991 | Ledoux | 425/140 |
| 5,031,440 | 7/1991 | Enami | 72/176 |
| 5,091,137 | 2/1992 | Ledoux | 264/516 |
| 5,112,211 | 5/1992 | LeDoux et al. | 425/384 |

Primary Examiner—Jay H. Woo
Assistant Examiner—James P. Mackey
Attorney, Agent, or Firm—Kinney & Lange

[57] ABSTRACT

An apparatus for deforming a pipe includes a boxed structure having an entry and exit for the pipe. The boxed structure acts as a constraint on a peripheral of the pipe along a path of movement thereof. An elongate wedge member depends inwardly from the boxed structure and is arranged in use to lie alongside the path of movement of the pipe and to project increasingly into the pipe as the pipe moves past the wedge member in a forward direction in the path of movement. The pipe to be deformed in the path of movement is engaged progressively increasingly by the wedge member whereby to indent progressively a part of the peripheral wall of the pipe such to deform the pipe longitudinally in the path of movement with the pipe through the boxed structure.

10 Claims, 2 Drawing Sheets

APPARATUS FOR PRODUCING A DEFORMED PIPE

BACKGROUND OF THE INVENTION

This invention relates to apparatus for and methods of producing a deformed pipe, and especially although not exclusively apparatus for and methods of producing a deformed pipe of thermoplastics material for use in lining pipework, especially for relining underground pipework such as old or leaky sewers, water mains and service pipes for example.

Techniques are known for carrying out relining of such pipework using plastics pipe, such as polyethylene pipe, in which the pipe is reduced in diameter, by deformation either in the production plant, or adjacent the site of relining of the pipework concerned, is inserted in its reduced condition into the pipework, and then expanded to its original size to fit the pipework.

It is also known to effect such reduction in cross section of the pipe by carrying out a deformation longitudinally of the pipe so that the peripheral wall thereof is indented longitudinally to create a generally U-shaped cross section which can be reduced in overall cross-sectional dimension, or even partially flattened and folded over.

It is an object of the present invention to enable the provision of a deformed pipe by simple, effective, and relatively inexpensive means.

SUMMARY OF THE INVENTION

In accordance with one aspect of the invention there is provided apparatus for deforming a pipe comprising a wedge member arranged in use to lie alongside a path of movement of the pipe to be deformed, and project increasingly into the pipe as the pipe moves past it in the forward direction of its path; and pipe constraint means disposed about the path of travel of the pipe in accociation with the wedge member whereby in use a pipe to be deformed in its path of travel is engaged progressively increasingly by the wedge member whereby to indent progressively a part of the wall of the pipe such as to deform the pipe longitudinally.

In accordance with another aspect of the invention there is provided a method of deforming a pipe comprising passing the pipe through constraint means disposed about a path of travel of the pipe and engaging the pipe during transit through the constraint means progressively increasingly with an elongate wedge member alongside the path of travel of the pipe whereby to indent progressively a part of the wall of the pipe such as to deform the pipe longitudinally.

The wedge member may form part of a generally elongate box structure having an entry and an exit for the pipe, the structure acting as the pipe constraint about the path of travel of the pipe. The box structure may taper from the entry to the exit.

The box structure may be formed from or incorporate an endless belt where contact is made with the pipe in use. The endless belt may be freely moveable by contact with the pipe or may be positively driven.

The wedge member may be in a form of a fin depending inwardly of the box structure from one wall thereof, the fin may increase in its projection into the box along its length in the direction of travel, in use, of the pipe therethrough. The fin may be capable of depth adjustment, which adjustment may in one embodiment be capable of being made during operation.

The wedge member may be rigid and may have a fixed surface or surfaces contacting the pipe in use or it may carry or comprise at least one appropriately supported endless belt arranged to engage and indent progressively a part of the wall of the pipe. The endless belt may be arranged in an elongate disposition along or acting as an edge and/or side of the wedge.

It is to be understood that the expression "endless belt" as used herein includes any appropriate and tough and continuous elongate member of overall flexible disposition such as a continuous member of belt-like or web-like disposition and composition or a chain, or cable for example.

The endless belt may be supported by rollers or pulleys for example at appropriate positions, and may be driven to move with the pipe in use, or may be moved by contact from the pipe.

The box structure may have dimensions such that on entering a pipe therein the fin does not initially engage, or only slightly engages the peripheral wall of the pipe.

BRIEF DESCRIPTION OF THE DRAWINGS

In order that the invention may be more readily understood two embodiments thereof will now be described by way of example with reference to the accompanying drawing in which.

DETAILED DESCRIPTION OF THE PREFERRED EMBODIMENTS

Figure 1:
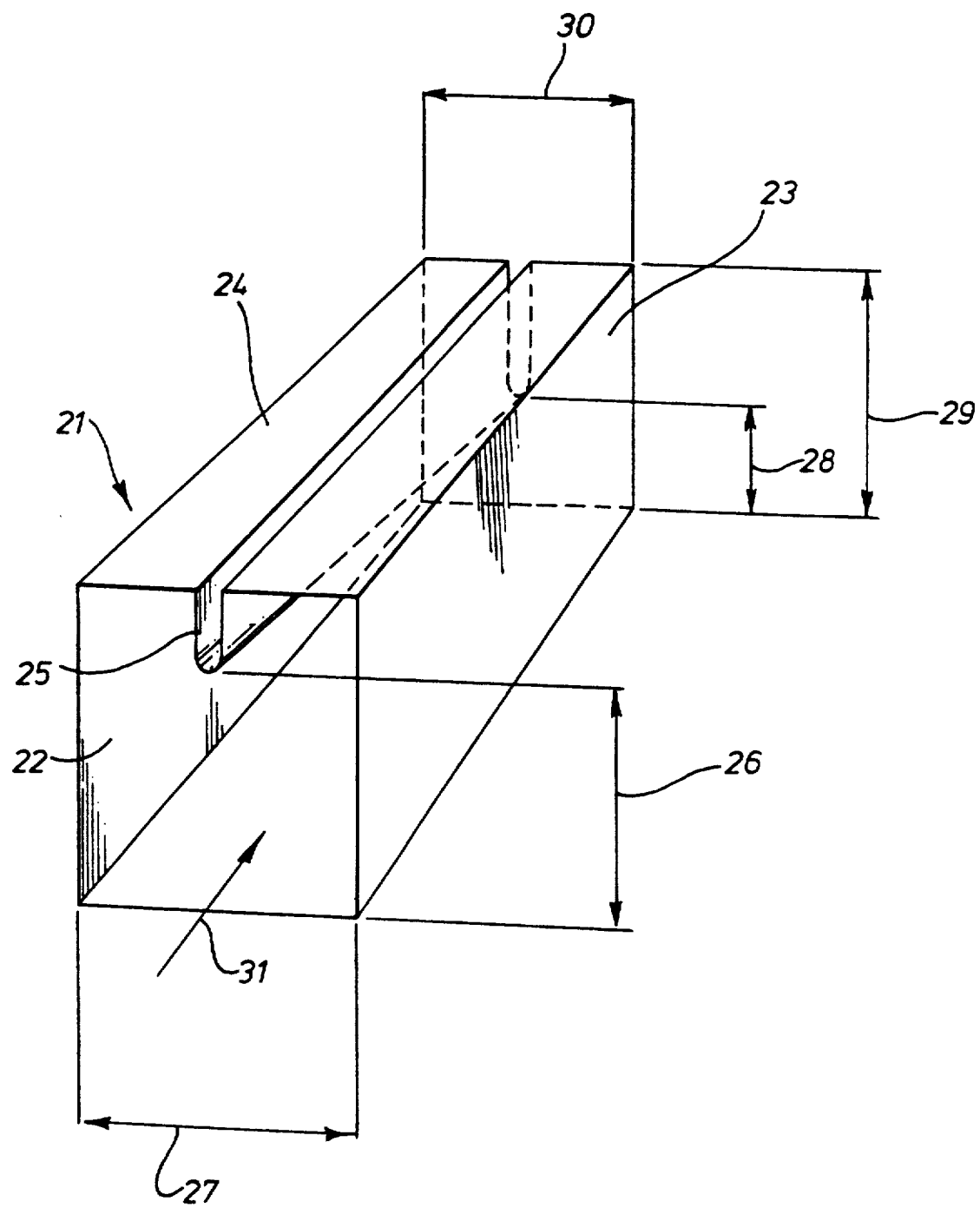
FIG. 1 is a schematic representation of one form of apparatus for deforming a pipe in accordance with the invention.

Referring to FIG. 1 it will be seen that the apparatus comprises a generally box like structure 21 of elongate configuration having openings 22,23 at each end for the entry and exit respectively of a pipe to be deformed (not shown). In practice the pipe will commonly be a thermoplastics pipe such as a polyethylene pipe. The box tapers from the entry 22 to the exit 23.

Extending along one generally closed wall 24 of the box 21 is an inwardly projecting fin 25 comprising the wedge member for indenting and deforming the pipe passing therethrough. It is to be observed that the fin 25 increases in its projection into the box along the length of the box like structure from the entry 22 to the exit 23, although in other embodiments the fin may be of constant depths.

The dimensions of the box like structure may be such that at the entry 22 the depth 26 below the fin 25 is approximately equal to the outside diameter of the plastics pipe to be deformed, and its width 27 is similarly approximately equal to, or slightly greater than such outside diameter. Conveniently the height 28 of the exit 23 of the box below the fin is equal to or slightly greater than twice the wall thickness of the plastic pipe to be deformed, whilst the overall height 29 of the exit 23 is approximately equal to a quarter of the pipe's exterior circumference. Again, the width 30 of the exit 23 is conveniently slightly greater than four times the pipe's wall thickness.

It has been found that on passing a pipe of the appropriate dimensions and wall thickness through the box structure illustrated in the direction of arrow 31 having such dimensions, the pipe is successfully and progressively indented by the depending fixed fin 25 and that a deformed pipe of generally U-shaped cross-section configuration of appropriately reduced overall cross-sectional dimensions passes from the exit of the box structure.

Conveniently a pipe is entered into the box like structure in a heated condition and can be arranged to be held in its deformed configuration whilst being subjected to cooling to prevent the pipe reverting to its original configuration while still hot.

The pipe to be deformed will often be of circular section, but it is to be appreciated that with appropriate dimensions of a box structure and fin, pipes of other cross-sections, such as oval or egg shaped can be deformed by the invention.

The box like structure can be arranged to be adjustable so that its dimensions and/or geometry can be varied to permit optimum deforming performance for a variety of plastics pipe sizes and/or temperatures of operation.

The box like structure 21 and its associated wedge like fin 25 may be formed from plate material provided with cut-out portions (not shown) positioned to reduce the rubbing contact between the pipe passing through the box like structure so as to reduce the force necessary to carry out such passage therethrough, and also to reduce the weight and cost of the box like structure.

Alternatively (not shown), the box can be made out of metal, such as steel rods or bars extending longitudinally of the direction of passage of the pipe. Such an arrangement can reduce to a very significant effect the rubbing contact areas of the box with the outside walls of the pipe, and also provides facility for ready adjustment of the dimensions and geometry of the box like structure with appropriate interconnections therebetween.

The parts of the walls of the box which bear upon and rub against the wall of the pipe during its passage therethrough may be so shaped as to follow or reinforce a smooth U-shape in section (if such is required for the eventual deformed pipe).

Again, projections (not shown) from the upper wall 24 of the box 21 on either side of the fin 25 can be provided so as to give different ultimate shapes to the deformed pipe. Such projections can be sloped to maintain equal length legs to the deformed pipe, or to achieve prescribed differences in the leg lengths which practice has been shown to help minimise the maximum surface strain for a given flattened thickness.

The surfaces of the box like structure which rub against the side walls of the pipe during passage therethrough may have polymeric coatings for example to reduce friction, or alternatively can be constituted by shaped polymeric blocks, rods or plates all of which can be adjustable or replaceable to enable adjustment of the dimensions and geometry of the box.

There may be provided downstream of the box like structure a containment region (not shown) which can be formed for example of longitudinally extending flutes defining a volume of cross-sectional dimensions equivalent to the exit 23 from the box, such extension flutes forming, for example, part of a wrapping machine where the deformed pipe can be helically wrapped with tape to ensure maintenance of the deformed configuration. Alternatively, or in addition, such extension flutes can define or help define a zone in which the pipe is subjected to forced cooling for example by water jets or water immersion, to "fix" a previously warmed pipe into its deformed shape.

In operation plastics pipe which may be at an elevated temperature or at ambient temperature is pulled through the box like structure by means of an appropriate towing hitch arrangement (not shown), and/or is pushed through using known pipe jacking machinery (not shown) to produce a deformed pipe by means of the fin and without the use of any moving part in the formation of the pipe indentation.

The resultant deformed plastics pipe may be coiled or wound on a drum downstream of the box like structure for subsequent use in relining pipework, or the invention may be carried out on the site of the pipework to be lined and the deformed pipe inserted directly from the machine into the deficient pipework requiring renovation, for subsequent reformation to its original configuration by any convenient known technique.

Figure 2:
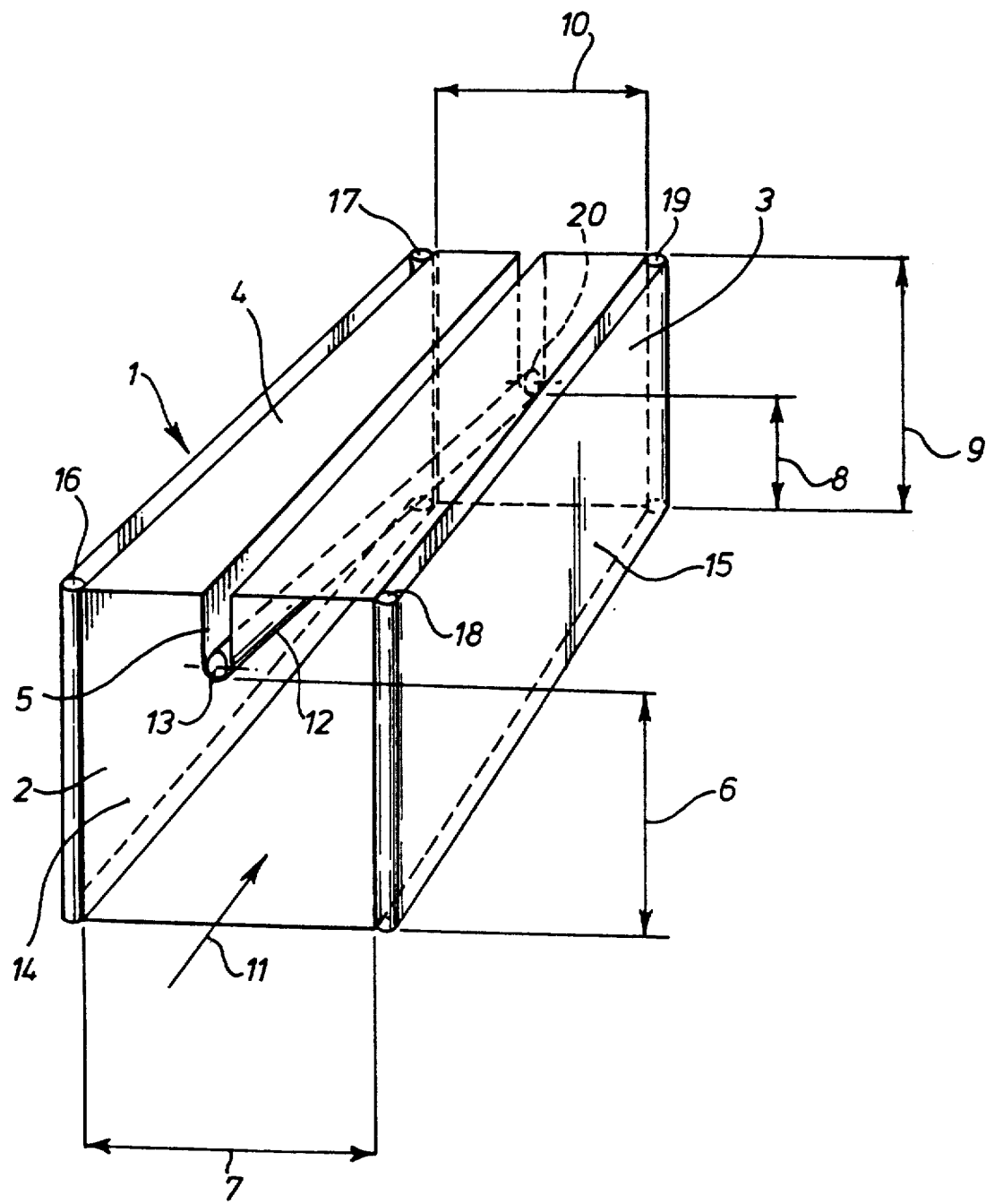
FIG. 2 is a schematic representation of a second form of apparatus for deforming a pipe in accordance with the invention.

Referring to FIG. 2 it will be seen that, as with FIG. 1, the apparatus comprises a generally box-like structure 1 of elongate configuration having openings 2,3 at each end for the entry and exit respectively of a pipe to be deformed (not shown). In practice the pipe will commonly be a thermoplastics pipe such as a polyethylene pipe. The box again tapers from the entry 2 to the exit 3.

Extending along one generally closed wall 4 of the box 1 is an inwardly projecting fin 5 comprising the wedge member for indenting and deforming the pipe passing therethrough. It is to be observed that the fin 5 increases in its projection into the box along the length of the box-like structure from the entry 2 to the exit 3, although in other embodiments the fin may be of constant depths.

The dimensions of the box-like structure may be such that at the entry 2 the depth 6 below the fin 5 is approximately equal to the outside diameter of the plastics pipe to be deformed, and its width 7 is similarly approximately equal to, or slightly greater than such outside diameter. Conveniently the height 8 of the exit 3 of the box below the fin is equal to or slightly greater than twice the wall thickness of the plastic pipe to be deformed, whilst the overall height 9 of the exit 3 is approximately equal to a quarter of the pipe's exterior circumference. Again, the width 10 of the exit 3 is conveniently slightly greater than four times the pipe's wall thickness.

In the alternative embodiment of the invention illustrated in FIG. 2, the lower edge of the fin 5 is provided with an endless belt 12 formed of a metal cable running between two freely rotatable end pulleys 13,20 together with a number of intermediate support pulleys (not shown). The endless belt 12 runs along the outside of the fin 5 and back along the inside of the fin 5.

Again, side walls of the box are constituted by endless belts 14,15 formed of flexible webs of metal, moving about and carried on vertical rollers 16,17 and 18,19 at each end.

The provision of the endless belt 12 and the endless belts 14,15, which contact and move with pipes passing therethrough, aids the passage of the pipe.

It is to be understood that the foregoing is merely exemplary of apparatus for and methods of deforming pipes in accordance with the invention and that modifications can readily be made thereto without departing from the true scope of the invention.

What is claimed is:

1. An apparatus for deforming a pipe comprising:

a boxed structure having an entry and an exit for the pipe, the boxed structure acting as a constraint on a peripheral wall of the pipe along a path of movement thereof through the boxed structure; and an elongate wedge member depending inwardly from a wall of the boxed structure and arranged in use to lie alongside the path of movement of the pipe and to project increasingly into the pipe as the pipe moves past the wedge member in a forward direction in the path of movement; whereby in use the pipe to be deformed in the path of movement is engaged progressively increasingly by the wedge member whereby to indent progressively a part of the peripheral wall of the pipe such as to deform the pipe longitudinally in the path of movement of the pipe through the boxed structure.

2. Apparatus as claimed in claim 1, wherein the boxed structure tapers from the entry to the exit thereof.

3. Apparatus as claimed in claim 1, wherein the wedge member is in the form of a fin depending inwardly of the boxed structure from the wall thereof.

4. Apparatus as claimed in claim 1, wherein the wedge member increases in its projection into the boxed structure along its length in the forward direction of movement of the pipe therethrough.

5. Apparatus as claimed in claim 1, further comprising means for depth adjustment of the wedge member.

6. Apparatus as claimed in claim 1, further comprising means for depth adjustment of the wedge member during operation of the apparatus.

7. Apparatus as claimed in claim 1, wherein the boxed structure has dimensions such that on entering the pipe therein, the wedge member does not initially engage the peripheral wall of the pipe.

8. Apparatus as claimed in claim 1 wherein the wedge member comprises at least one endless belt arranged to engage and indent progressively a part of the wall of the pipe.

9. Apparatus as claimed in claim 8 wherein the endless belt is arranged in an elongate disposition along at least one surface of the wedge member.

10. Apparatus as claimed in claim 8 wherein at least one wall of the boxed structure is formed from an endless belt where contact is made with the pipe in use.

* * * * *

UNITED STATES PATENT AND TRADEMARK OFFICE
CERTIFICATE OF CORRECTION

PATENT NO. : 5,318,421

DATED : June 7, 1994

INVENTOR(S) : RAYMOND KIPPIATT

It is certified that error appears in the above-indentified patent and that said Letters Patent is hereby corrected as shown below:

Col. 1, lines 39-40, delete "accociation", insert --association--

Signed and Sealed this

Thirteenth Day of September, 1994

Attest:

BRUCE LEHMAN

Attesting Officer

Commissioner of Patents and Trademarks